Figure 1:
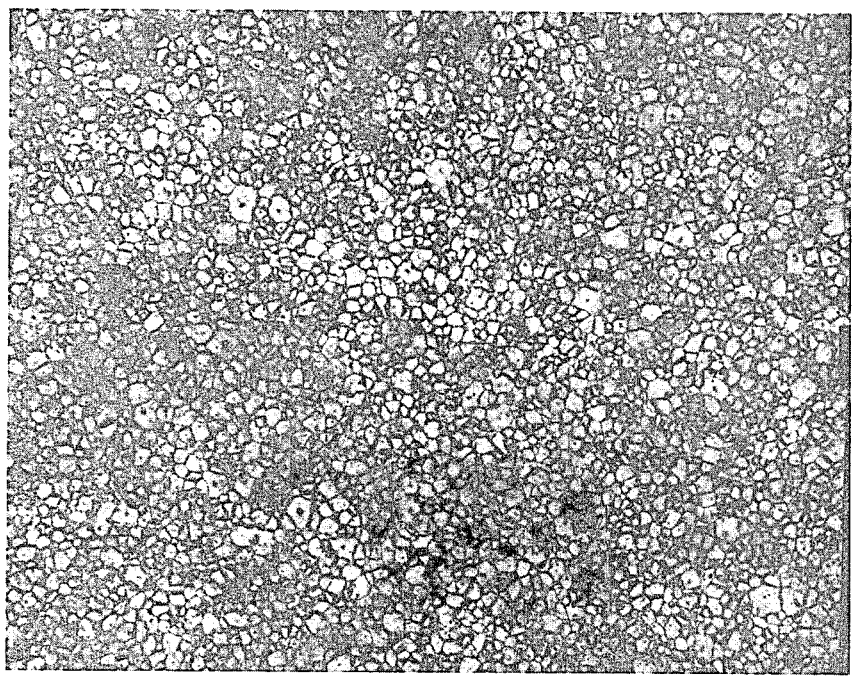

United States Patent [19]

Charles et al.

[11] 4,285,732

[45] Aug. 25, 1981

[54] ALUMINA CERAMIC

[75] Inventors: Richard J. Charles, Schenectady; Svante Prochazka, Ballston Lake, both of N.Y.; Curtis E. Scott, Eastlake, Ohio

[73] Assignee: General Electric Company, Schenectady, N.Y.

[21] Appl. No.: 129,471

[22] Filed: Mar. 11, 1980

[51] Int. Cl.$^3$ .................. C04B 35/02; C04B 35/48
[52] U.S. Cl. ........................................ 106/57; 106/62; 106/65; 106/73.4
[58] Field of Search .................. 106/57, 62, 65, 73.4

[56] References Cited

U.S. PATENT DOCUMENTS

| 3,026,177 | 3/1962 | St. Pierre et al. ............... 106/62 |
| 3,026,210 | 3/1962 | Coble ............................ 106/73.4 |

FOREIGN PATENT DOCUMENTS

| 43-15304 | 7/1968 | Japan ............................ 106/65 |
| 531795 | 10/1976 | U.S.S.R. ...................... 106/57 |

OTHER PUBLICATIONS

Alumina as a Ceramic Material, Am. Cer. Soc., 1970, pp. 127–144.

*Primary Examiner*—James Poer
*Attorney, Agent, or Firm*—Jane M. Binkowski; James C. Davis, Jr.; Leo I. MaLossi

[57] ABSTRACT

A particulate dispersion of $\alpha$-alumina, magnesium oxide and an additive selected from the group consisting of zirconium oxide, hafnium oxide and mixtures thereof, is formed into a green body and sintered in hydrogen producing a theoretically dense ceramic with improved optical transmission properties.

14 Claims, 2 Drawing Figures

ALUMINA CERAMIC

This invention relates to a method for producing an optically translucent alumina ceramic.

U.S. Pat. No. 3,026,177 to St. Pierre et al. discloses the production of a transparent alumina body by subjecting a compact of alumina to a first firing in hydrogen at 1650° C. to 1750° C. to effect removal of gas-containing pores from the body, and subjecting the body to a second firing in hydrogen at 1800° C. to 2000° C. for not less than 15 minutes to remove additional pores and improve the transparency of the body.

U.S. Pat. No. 3,026,210 to Coble discloses the production of a high density alumina body having substantial transparency by forming a mixture of alumina powder and a small but effective amount up to 0.5 weight percent of magnesia powder into a compact, and firing the compact at 1700° C. to 1950° C. in vacuum or hydrogen.

It has been found that MgO, at a small level, is a necessary constituent in alumina ceramics if a high degree of transluceny is to be obtained in the sintering process. In principle magnesia aids the elimination of residual porosity by preventing the entrapment of pores inside alumina grains, so called break-away of pores from grain boundaries. In addition MgO controls grain growth in the late stages of sintering making possible generation of microstructures composed of uniform, isometric grains by a process designated as normal grain growth. In absence of MgO, or if its concentration in $Al_2O_3$ is too low, the growth of grains in the late stages of sintering, when the density exceeds about 98%, is extremely rapid and nonuniform making fabrication of ceramics with a controlled grain size impossible. The necessary level of MgO is that corresponding to the solubility limit of MgO in $\alpha$-$Al_2O_3$ at the sintering temperature, which is about 0.03% by weight. Higher levels of MgO are also effective in controlling grain growth, however the excess MgO (above the solubility limit) forms a second phase, usually spinel, i.e. magnesium aluminate, $MgAl_2O_4$, occurring as crystallites distributed among the grains of $\alpha$-$Al_2O_3$. Such second phase inclusions are undesirable as they contribute to light scattering, i.e. they will decrease the light transmission of the product. Consequently the desired end product contains the minimal amount of MgO, sufficient to control grain growth and pore removal.

The difficulty in past fabrication of highly translucent alumina arises from the circumstance that the magnesium doping level is decreased during sintering in hydrogen due to its volatility. As a consequence it is necessary to use higher doping levels in the starting compositions to compensate for the losses in the sintering operation. However the rate of Mg evaporation depends on a number of parameters such as temperature, the volume flow rate and the dew point of hydrogen through the furnace, the heating rate, the hold time, the thickness of the sintered body, the geometry of the kiln furniture, and the linear velocity of the sintering atmosphere at the surface of the sintered objects. Some of these parameters are difficult to control so that in practice it is impossible to run the sintering operation in such a way to end up with a product containing the ideal level of MgO. For practical reasons, it has been necessary to work with an increased level of MgO i.e. to sacrifice some transmission in order to secure grain growth control. Consequently, the resulting product always contained some second phase magnesium aluminate, which could be eliminated by extensive heating in a dry atmosphere, but such heating caused exaggerated grain growth making the product weak.

In contrast, the present process prevents any significant loss of magnesium during sintering and allows the magnesium content of the sintered ceramic body to be predetermined. Since there is no significant loss of magnesium in the present process, it is substantially more flexible than prior art processes. For example, the present process is not significantly sensitive to parameters such as volume flow rate of hydrogen through the furnace, temperature gradients during sintering, or dew point of the hydrogen sintering atmosphere.

In the present invention, additions of additive selected from the group consisting of $ZrO_2$, $HfO_2$ and mixtures thereof, to MgO doped alumina at specific levels of the additions prevents precipitation of the spinal phase if such composition is sintered in hydrogen. In addition exaggerated grain growth in the present additive containing specimens does not occur although simultaneously sintered alumina specimens doped only with the same amount of MgO showed clearly "runaway" grain growth. The observed effect is believed attributable to an increase of the solubility of MgO in $Al_2O_3$ due to the presence of the present additive. The increased solubility would bring about decreased activity of Mg in $Al_2O_3$ and result in reduced evaporation of Mg. Similarly it would account for the presence of spinel precipitates in the final product.

Figure 2:
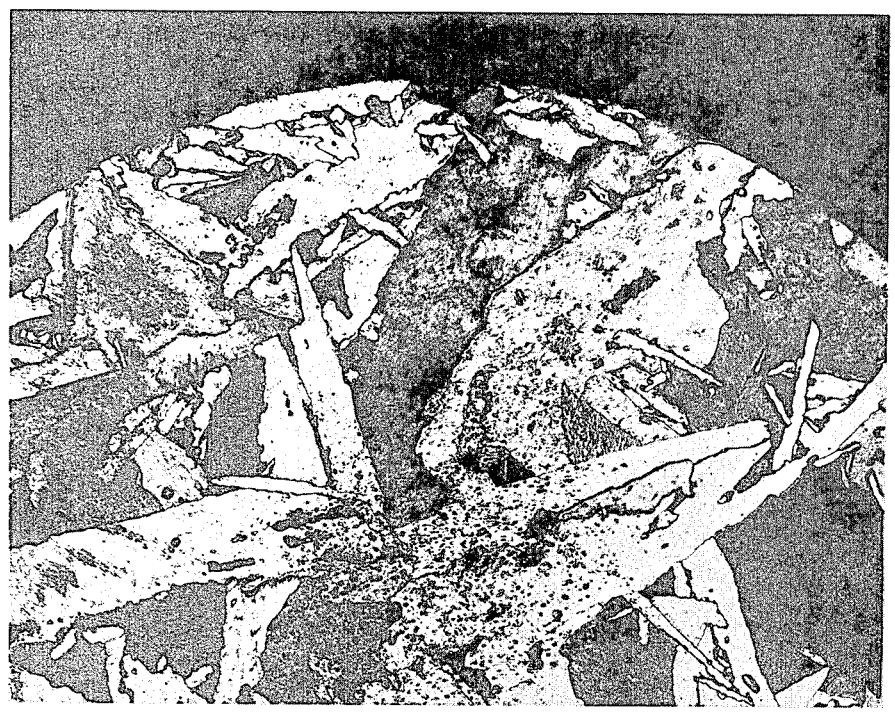

Those skilled in the art will gain a further and better understanding of the present invention from the detailed description set forth below, considered in conjunction with the figures accompanying and forming a part of the specification, in which:

FIG. 1 is a photomicrograph (magnified 65×) showing the face of a sintered alumina disc produced in accordance with the present invention utilizing MgO and $ZrO_2$, and FIG. 2 is a photomicrograph (magnified 11×) showing the face of a sintered disc produced in substantially the same manner as the disc of FIG. 1 but without the use of $ZrO_2$.

Briefly stated, the present process for producing an optically translucent polycrystalline sintered body comprises providing at least a substantially homogeneous dispersion composed of alumina, MgO or precursor therefor, and an additive selected from the group consisting of $ZrO_2$, $HfO_2$ and mixtures thereof, or precursors therefor, said alumina ranging in composition from $\alpha$-$Al_2O_3$ to at least about 80% by weight $\alpha$-$Al_2O_3$ with the remaining alumina being of polymorphic form other than $\alpha$, said MgO being present in an amount ranging from about 0.03% by weight to less than about 0.15% by weight of said alumina, said $ZrO_2$ being present in an amount ranging from higher than 0.002% by weight up to about 0.07% by weight of said alumina, said $HfO_2$ being present in an amount ranging from higher than 0.003% by weight up to about 0.12% by weight of said alumina, said mixtures of $ZrO_2$ and $HfO_2$ being composed of all ratios of $ZrO_2$ and $HfO_2$ and being present in a total amount ranging from higher than 0.002% by weight up to about 0.12% by weight of said alumina, said dispersion having an average crystallite size ranging from about 0.05 micron to less than one micron, forming said dispersion into a green body having a density of at least about 30% of the theoretical density of 3.98 g/cc for alumina, and sintering said body in an atmosphere of hydrogen having a dew point higher than −30° C. at a sintering temperature ranging from about 1750° C. to about 1950° C. producing a sintered body of theoretical density based on the density of 3.98 g/cc for alumina, said precursor decomposing completely below said sintering temperature to form said oxide and by-product gas, said sintered body containing magnesium in an amount equivalent to from about 0.03% MgO by weight to less than about 0.15% MgO by weight of said body and a component selected from the group consisting of zirconium, hafnium, and mixtures thereof, said zirconium being present in an amount equivalent to from higher than about 0.002% $ZrO_2$ by weight up to about 0.07% $ZrO_2$ by weight of said sintered body, said hafnium being present in an amount equivalent to from higher than 0.003% $HfO_2$ by weight up to about 0.12% $HfO_2$ by weight of said sintered body, said mixtures thereof being composed of all ratios of said zirconium and hafnium and being present in an amount equivalent to from higher than 0.002% of the di-oxides thereof by weight up to about 0.12% of the di-oxides thereof by weight of said sintered body.

By an optically translucent polycrystalline sintered body it is meant herein a body through which light or radiation in the visible wave length is able to pass through sufficiently to make such body useful for optical applications such as enclosures for arc tubes.

In carrying out the present process, a particulate homogeneous or at least a substantially homogeneous dispersion of alumina, MgO and additive is formed. Alternatively, in the present process, if desired, an inorganic or organic precursor of MgO or additive can be used. The precursor should decompose to form the oxide and by-product gas or gases before sintering temperature is reached leaving no contaminants in the sintered body. Representatives of the precursors of MgO or additive useful in the present process are the carbonates, hydroxides, nitrates, and stearates of magnesium, zirconium or hafnium. The precursor should be used in an amount sufficient to produce the respective oxide in the desired amount.

The alumina used in the present process can range in composition from $\alpha$-$Al_2O_3$ to at least about 80% by weight of $\alpha$-$Al_2O_3$ with the remaining alumina being of polymorphic form other than $\alpha$. $\alpha$-$Al_2O_3$ is preferred since it gives the lowest shrinkage in sintering and best control of grain growth.

In carrying out the present process, the alumina can be of commercial or technical grade. Specifically, it should not contain any impurities which would have a significantly deleterious effect on the desired optical transmission properties of the resulting sintered product, and preferably, the alumina is at least about 99.5% pure.

MgO is used in an amount ranging from about 0.03% by weight to less than about 0.15% by weight of alumina. Amounts of MgO less than about 0.03% by weight of alumina produce a ceramic body with exaggerated grain growth. On the other hand, 0.15% MgO by weight of alumina and higher do not produce a ceramic body with suitable light transmission properties. For best results and to insure attainment of a single phase sintered body, about 0.03% MgO by weight of alumina is preferred.

The additive used in the present process is selected from the group consisting of $ZrO_2$, $HfO_2$ and mixtures thereof.

$ZrO_2$ is used in an amount ranging from greater than 0.002% by weight of alumina up to about 0.07% by weight of alumina. Amounts of $ZrO_2$ of 0.002% by weight and lower are not effective in the present process. On the other hand, amounts of $ZrO_2$ higher than 0.07% by weight bring about formation of second phase and result in less control of grain growth. For best results, the amount of $ZrO_2$ ranges from about 0.01% by weight of alumina up to about 0.04% by weight of alumina.

$HfO_2$ is used in an amount ranging from greater than 0.003% by weight of alumina up to about 0.12% by weight of alumina. Amounts of $HfO_2$ of 0.003% by weight and lower are not effective in the present process. On the other hand, amounts of $HfO_2$ higher than 0.12% by weight bring about formation of second phase and result in less control of grain growth. For best results, the amount of $HfO_2$ ranges from about 0.01% by weight of alumina up to about 0.07% by weight of alumina.

The present additive also is a mixture of $ZrO_2$ and $HfO_2$ which is composed of all ratios of $ZrO_2$ and $HfO_2$ and which is present in total amount ranging from greater than 0.002% by weight of alumina up to about 0.12% by weight of alumina. Amounts of the mixture of $ZrO_2$ and $HfO_2$ of 0.002% by weight and lower are not effective in the present process. On the other hand, amounts of the mixture of $ZrO_2$ and $HfO_2$ higher than 0.12% by weight bring about formation of second phase and result in less control of grain growth. For best results, the amount of the mixture of $ZrO_2$ and $HfO_2$ ranges from about 0.01% by weight of alumina up to about 0.07% by weight of alumina.

In the present invention, the particular amount of MgO and additive used, i.e. $ZrO_2$ $HfO_2$ and mixtures thereof, as well as the particular composition of the mixture of $ZrO_2$ and $HfO_2$, depends on the particular properties desired in the final product and is determinable empirically. For example, with $ZrO_2$ ranging from about 0.01% by weight to about 0.04% by weight of alumina, or similarly with $HfO_2$ or mixtures of $ZrO_2$ and $HfO_2$ ranging from about 0.01% by weight to about 0.07% by weight of alumina, MgO in an amount of about 0.03% by weight produces a single phase ceramic body with high optical transmission, i.e. the body is optically translucent to a substantial degree. But, as the MgO content approaches 0.05% by weight, the resulting sintered body may be single-phase or may contain a minor amount of secondary phase or phases insufficient to significantly affect its optical transmission properties, i.e. its optical translucency. Further increase of the MgO content increases the volume of secondary phase material in the sintered body thereby increasing light scattering by the sintered body, i.e. thereby decreasing its optical transluceny.

The alumina, MgO and additive, or the precursors for MgO and the additive, can be admixed by a number of techniques such as, for example, ball milling, vibratory milling or jet milling, to produce a significantly or substantially uniform or homogeneous dispersion or mixture. The more uniform the dispersion, the more uniform is the microstructure, and therefore, the properties of the resulting sintered body.

Representative of these mixing techniques is ball milling, preferably with balls of material such as $\alpha$-$Al_2O_3$ which has low wear and which has no significant detrimental effect on the properties desired in the final product. If desired, such milling can also be used to break down any agglomerates and reduce all materials to comparable particle sizes. Milling may be carried out dry or with the charge suspended in a liquid medium inert to the ingredients. Typical liquids include water, ethyl alcohol and carbon tetrachloride. Milling time varies widely and depends largely on the amount and particle size reduction desired and type of milling equipment. In general, milling time ranges from about 1 hour to about 100 hours. Wet milled material can be dried by a number of conventional techniques to remove the liquid medium. Preferably, it is dried by spray drying.

In the present dispersion the average crystallite size ranges from about 0.05 micron, i.e. a mean specific area of about 30 m$^2$/g, to less than one micron. An average crystallite size less than about 0.05 micron is not useful since it is generally difficult or impractical to compact the powder to densities of at least 30% of the theoretical. On the other hand, an average crystallite size of one micron or higher will produce a ceramic body with a final density lower than the theoretical density of sapphire. Preferably, the average crystallite size of the dispersion ranges from about 0.09 micron, i.e. a mean specific surface area of about 16 m$^2$/g, to about 0.5 micron, i.e. a mean specific surface area of about 3 m$^2$/g.

A number of techniques can be used to shape the powder mixture, i.e. homogeneous dispersion, into a green body. For example, it can be extruded, injection molded, die-pressed, isostatically pressed or slip cast to produce the green body of desired shape. Any lubricants, binders or similar materials used in shaping the powder mixture should have no significant deteriorating effect on the resulting sintered body. Such materials are preferably of the type which evaporate on heating at relatively low temperatures, preferably below 500° C., leaving no significant residue. The green body should have a density of at least 30%, and preferably 45% of higher, of the theoretical density of 3.98 g/cc for alumina, to promote densification during sintering and achieve attainment of theoretical density.

Preferably, before sintering, the green body or compact is prefired in an oxygen-containing atmosphere such as air at a temperature ranging from about 800° C. to about 1300° C., preferably at about 1100° C. to eliminate impurities including shaping aids and water which would have a significantly deleterious effect on the optical translucency of the sintered body. The particular firing temperature and firing period is determinable empirically and depends largely on the level of impurities present and on the thickness of the body, and generally ranges from about one to five hours. Such prefiring allows the sintering atmosphere to be free of impurities, and imparts sufficient strength to the compact allowing it to be more easily handled and machined. In addition, such prefiring ordinarily decomposes the precursors of MgO and the additive.

The green or prefired body is sintered in an atmosphere of hydrogen having a dew point higher than −30° C. The particular dew point of hydrogen is not critical. In practice, it may range up to about 30° C., and generally dew points from about −10° C. to about 20° C. are utilized. In the present process, the sintering atmosphere of hydrogen gas is a flowing atmosphere and need only be sufficiently flowing to remove gaseous products which may be present, normally as a result of contaminants. Generally, the particular flow rate of hydrogen gas depends on the size of the furnace loading and somewhat on sintering temperature. The sintering atmosphere is at atmospheric or about atmospheric pressure, or can be under reduced pressure, for example, a reduced pressure ranging down to about 200 microns.

The present sintering temperature ranges from about 1750° C. to about 1950° C., and preferably from about 1800° C. to about 1900° C. Sintering temperatures lower than about 1750° C. produce a sintered body which is not translucent because of its small grain size. On the other hand, temperatures higher than 1950° C. produce a sintered body with grains that are too large and thereby rendering it with poor strength.

The rate of heating to sintering temperature depends to a large extent on the prefiring treatment and the extent of impurities in the starting alumina powder. When the green body or compact has been prefired to remove impurities, heating rates of up to about 600° C. per hour up to sintering temperature ordinarily may be used. However, where there has been no prefiring of the body, the rate of heating should be such so as to eliminate impurities before the body reaches a temperature which locks these impurities in. Preferably, where there has been no prefiring of the body, the rate of heating up to about 800° C. can vary, but the body is soaked at a temperature ranging from about 800° C. to about 1300° C. in an oxygen-containing atmosphere such as wet hydrogen, preferably having a dew point of at least about 0° C., to eliminate impurities which would have a significantly deleterious effect on the optical translucency of the sintered body. The particular soaking temperature and time period are determinable empirically depending upon the impurities which must be eliminated, but usually the time period ranges from about 3 hours to ten hours. After such soaking or heat treatment, the compact can be heated to sintering temperature at rates which ordinarily can range up to about 600° C. per hour.

The particular sintering time period depends largely on the sintering temperature and is determinable empirically with increasing sintering temperature requiring less sintering time. Generally, however, a sintering temperature of about 1800° C. requires a sintering time period of about 10 hours, and a sintering temperature of about 1900° C. requires a sintering time period of about 3 hours to produce the present sintered body of theoretical density.

Another factor in determining the sintering temperature and time at temperature is the doping level of the present additive. As the level of the additive is increased, the grain size in the sintered body increases at constant sintering conditions. Thus if a specific grain size is desired the sintering temperature or time or both may be reduced for bodies containing higher levels of the present additive within the specified limits.

The present polycrystalline sintered body consists essentially of alumina, magnesium and a component selected from the group consisting of zirconium, hafnium and mixtures thereof. The amount of magnesium is equivalent to an amount of MgO ranging from about 0.03% by weight to less than 0.15% by weight of the total weight of the sintered body. The amount of zirconium is equivalent to an amount of ZrO$_2$ ranging from greater than 0.002% by weight to about 0.07% by weight of the total weight of the sintered body.

The amount of hafnium is equivalent to an amount of HfO$_2$ ranging from greater than 0.003% by weight to about 0.12% by weight of the total weight of the sintered body. When the sintered body contains a mixture of zirconium and hafnium, such a mixture can be composed of all ratios of zirconium and hafnium, and such a mixture is equivalent to from greater than 0.002% of the di-oxides thereof by weight up to about 0.12% of the di-oxides thereof by weight of the total weight of the sintered body.

In the present process, there is no significant loss of magnesium, zirconium or hafnium, i.e. the content of magnesium, zirconium, and/or hafnium ions in the dispersion is not significantly different from that of the resulting sintered body. In the sintered body, Mg, Zr, and/or Hf are in the form of an oxide.

The sintered body is composed of alumina entirely in its α-crystalline form, i.e. all other crystalline polymorphs of $Al_2O_3$ present in the starting material transform into α-$Al_2O_3$ during sintering. The content of zirconium, hafnium and magnesium is detectable by emission spectroscopy, X-ray fluorescent analysis, mass spectroscopy and melt analysis.

The sintered body ranges from single phase to one comprised of a primary phase and secondary phase, said secondary phase ranging up to about but less than 1% by volume of the total volume of the sintered body. Such phase composition of the sintered body is determinable by optical microscopy. By the term single phase or primary phase it is meant herein the α-alumina phase.

Phase composition can be determined by a combination of techniques such as quantitative optical metallography on thin sections combined with identification of the minority phases by electron beam microanalysis. Such procedures show that with lower amounts of MgO and the additive, secondary phases are absent, i.e. the body is a single phase. With higher amounts of MgO and the additive, secondary phases are present. The secondary phase or phases form crystallites distributed along grains of the primary phase. Frequently the secondary phase contains oxides of aluminum, magnesium, and either zirconium or hafnium or both. The size of the secondary phase particles ranges from about 2 microns up to about 20 microns and in general increases with increasing time and temperature of sintering. The present sintered body of single phase contains the equivalent of about 0.03% by weight of MgO and the equivalent of $ZrO_2$ and/or $HfO_2$ ranging from about 0.01% by weight up to about 0.07% by weight of the total weight of the sintered body.

The present polycrystalline sintered body is of theoretical density, i.e. it has a density of 3.98 g/cc or a 100% density, based on the density of 3.98 g/cc for alumina. Such a sintered body may have residual small pores but the porosity is not detectable by current liquid displacement density measurements, i.e. it is less than 0.05% by volume of the total volume of the sintered body.

The present polycrystalline sintered body has an average grain size ranging from about 15 microns to about 100 microns. An average grain size less than about 15 microns usually renders the sintered body with poor optical properties. On the other hand, an average grain size higher than about 100 microns renders the sintered body with poor strength. Preferably, for best optical translucency and strength, the present sintered body has an average grain size ranging from about 20 microns to about 50 microns. The present polycrystalline sintered body is useful for optical applications such as enclosures for arc tubes.

The invention is further illustrated by the following examples wherein the procedure was as follows unless otherwise stated:

Alumina powder was used which was nominally 99.9% pure with no other X-ray detectable phases than α-$Al_2O_3$ and was characterized with the following results:

|  |  | PPM |
|---|---|---|
| Impurities by emission spectroscopy | Na | <2 |
|  | K | 10 |
|  | Fe | 20 |
|  | Si | <20 |
|  | Cr | 2 |
|  | Mg | <10 |
|  | Ca | <3 |
| Specific surface area | 8.3 m$^2$/g |  |
| Density | 3.89 g/cc |  |
| Particle Size | 95% < 2μ |  |

Surface area measurements were made by a low temperature nitrogen absorption technique.

Sintering was carried out in a molybdenum resistor furnace 7.5 cm I.D. equipped for monitoring of temperature and water vapor concentration in the sintering atmosphere.

Temperature was calibrated by an optical pyrometer and corrected for furnace window absorption.

At the end of each sintering run, the power was switched off and the sintered body was furnace-cooled to room temperature.

The bulk density of each pressing or compact was determined from its weight and dimensions.

Density of the sintered product was determined by water displacement using Archimedes method.

Sintering was carried out in flowing hydrogen.

Shrinkage is linear shrinkage ($\Delta L/L_o(\%)$), and it is the difference in length between the unsintered body, i.e. compact, and the sintered body, $\Delta L$, divided by the length of the compact, $L_o$. This shrinkage is an indication of the extent of densification.

Density of the green body and the sintered specimen is based on the density of 3.98 g/cc for alumina, and a theoretically dense sintered body is one having a 100% density based on the density of 3.98 g/cc for alumina.

Densities were obtained on the as-fired sintered bodies.

The degree of transmission of radiation through a material is defined by transmittance which is the ratio of the intensity of the transmitted beam and the intensity of the incident beam and refers to radiation of certain wave length and a specimen of certain thickness. These variables are related by the formula below, $$I/I_o = ke^{-\alpha d}$$

where I and $I_o$ are the intensities of the transmitted and incident beams, d the thickness of the specimen, α the absorption coefficient and k is a constant determinable from the refractive index of the material. In addition the cone angle of the incident beam and the cone angle of the transmitted beam have to be specified. The measurement of sintered specimens in the present work was done with a laser beam at a wave length of 0.63 μm so that the incident beam cone angle was very nearly zero. The transmitted beam cone angle was about 60°. The transmittance defined in this way is referred to in this invention as in-line transmittance. The values obtained in this manner are found to be more significant with respect to evaluation of differences in translucent alumina bodies than other quantities such as total transmission values or spectrophotometric transmittance scans.

EXAMPLE 1

In this Example three tests were carried out. In Test A, a batch powder composed of alumina and magnesium stearate was prepared, in Test B a batch powder, i.e. homogeneous dispersion, of alumina, magnesium stearate and zirconium stearate was prepared, whereas for Test C the batch powder was composed of alumina alone.

Specifically, in Test A, batch processing was comprised of adding 100 grams of alumina powder to 0.735 gram of magnesium stearate and the mixture was milled in 100 cc of carbon tetrachloride with 7.5 mm alumina balls for 6 hours. The carbon tetrachloride then was evaporated and the powder dry-milled for two hours and screened through a 100 mesh Tyler nylon screen. The magnesium stearate is a precursor for magnesium oxide and was equivalent to 0.05 gram magnesium oxide.

In Test B, 100 grams of alumina powder was added to 0.735 grams of magnesium stearate and 0.40 gram of zirconium stearate, and the mixture was processed in the same manner as in Test A to form a homogeneous dispersion. The zirconium stearate is a precursor for zirconium oxide and was equivalent to 0.04 gram of zirconium oxide. In Test C, the alumina powder was processed in the same manner as was used for the batches of Runs A and B.

A green disc, 25 mm in diameter and 3 mm in thickness, was die pressed from each batch powder to 47% theoretical density at 55 MPA. Each green disc was prefired at 1150° C. for two hours in air and then set on a molybdenum support sheet in a molybdenum resistor sintering furnace. During such prefiring, the magnesium stearate and zirconium stearate decomposed to form MgO and $ZrO_2$ and impurities which would have a deleterious effect on the optical translucency of the sintered disc were eliminated.

The furnace was purged with tank hydrogen for two hours and then hydrogen having a dew point higher than $-30°$ C. was passed into the furnace which was then brought up to a sintering temperature of 1880° C. in two hours, held at 1880° C. for three hours and shut-off. Dew point of the hydrogen, which was at about atmospheric pressure, was measured on the downstream end of the furnace by means of a zirconia oxygen probe and was 0° C. at the start of the hold and gradually drifted to lower values during the three hour sintering hold. The dew point measured at the end of the run was about $-10°$ C.

The sintered discs underwent 23% shrinkage. The doped specimens, i.e. the sintered discs of Tests A and B, each attained theoretical density, i.e. each had a density of 3.98 g/cc, and each was 2.44 mm thick, while the density of the undoped specimen of alumina alone, i.e. the sintered disc of Test C, was 3.96 g/cc corresponding to 99.3% of theoretical density.

The sintered disc of Test B which illustrates the present invention, was whitish in color and optically highly translucent, i.e. light passed through it to a substantial degree, and when it was pressed against newsprint, the newsprint could be read without difficulty. The sintered disc of Test A, doped with MgO only, also was optically translucent but had a fogginess which was not exhibited by the Test B disc, i.e. its clarity was significantly less than the clarity of the Test B disc. The sintered disc of Test C of alumina alone was white and opaque.

The sintered disc of Test B, doped with both MgO and $ZrO_2$ was composed of uniform grains of about 35 microns as shown in FIG. 1. FIG. 1 shows the microstructure of one face of the sintered disc of Test B. The faces of the undoped sintered disc of alumina alone of Test C, had a microstructure substantially similar to that shown in FIG. 2 composed of large grains up to 3 mm long. The faces of the sintered disc of Test A, i.e. the specimen doped with MgO only, had an exaggerated grain structure composed of large grains up to 3 mm long. One of the faces of the sintered disc of Test A is shown in FIG. 2 and illustrates its microstructure. The sintered discs of Tests A and C underwent exaggerated or run-away grain growth during sintering making them mechanically weak. Of the three Tests A, B and C, only Test B, containing both MgO and $ZrO_2$, achieved the required grain microstructure simultaneous with high optical translucency.

A thin section, cut across the specimens' thickness, about 50 microns thick, of the sintered disc of Test B and A was investigated by optical microscopy in transmitted white light. No second phase precipitates were observed in sintered specimen B, while copious precipitates, 1–3 microns grains, typical for magnesium aluminate, were observed in section of sintered specimen A particularly near its centerline. X-ray fluorescence analysis of sintered specimen B, which surface was slightly ground off, showed 290 PPM zirconium corresponding to 0.0364% zirconia per weight of sintered disc.

EXAMPLE 2

The procedure used in this Example was the same as that set forth in Example 1 except for the sintering atmosphere. Specifically, the procedure used in producing the sintered discs in the three tests of this Example was the same as that disclosed in Example 1, i.e. Tests A', B' and C' of this Example correspond to Tests A, B and C, respectively, of Example 1, except that they were sintered in a hydrogen atmosphere saturated at room temperature with water vapor. The dew point of the sintering hydrogen atmosphere was measured in the same manner as in Example 1 and was about 20° C.

The sintered discs underwent 23% shrinkage. The doped specimens, i.e. the sintered discs of Test A' doped with MgO and Test B' doped with MgO and $ZrO_2$, each attained theoretical density, i.e. each had a density of 3.98 g/cc, and each was 2.44 mm thick, while the density of the undoped specimen of alumina alone, i.e. the sintered disc of Test C', was 3.96 g/cc corresponding to 99.3% of theoretical density.

The sintered disc of Test B', which illustrates the present invention, was whitish in color and optically highly translucent, i.e. white light passed through it to a substantial degree, and when it was pressed against newsprint, the newsprint could be read without difficulty. Its clarity was the same as that of the Test B disc of Example 1. The sintered disc of Test A', doped with MgO only also was optically translucent but had a fogginess which was not exhibited by the Test B' disc, i.e. its clarity was significantly less than the clarity of the Test B' disc. The sintered disc of Test C' of alumina alone was white and opaque.

The sintered disc of Test B', doped with both MgO and $ZrO_2$, was composed of uniform grains. Its microstructure was substantially the same as that shown in FIG. 1. The faces of the undoped sintered disc of alumina alone of Test C' had a microstructure substantially similar to that shown in FIG. 2 composed of large grains up to 3 mm long which indicated uncontrolled grain growth.

The sintered disc of Test A', doped with MgO only, showed exaggerated grain growth on the exposed face extending from the edges inward, but regular fine grained microstructure on the side facing the molybdenum support sheet during sintering. The sintered disc of Test B', doped with MgO and $ZrO_2$ and which illustrates the present invention, was composed entirely of fine uniform grains and had an average grain size of about 35 microns. Its microstructure was substantially the same as that shown in FIG. 1. Of the three Tests A', B' and C', only Test B', containing both MgO and $ZrO_2$ achieved the required grain microstructure simultaneous with high optical translucency.

A thin section, about 50 microns thick, of the sintered disc of Test B' was investigated by optical microscopy in transmitted white light and determined to be single phase.

EXAMPLE 3

Five tests were carried out in this Example. The batch powder for each test was processed in the same manner as disclosed in Example 1. Specifically, in forming the batch powder of Test D 0.735 gram of magnesium stearate was used, in Test E 0.735 gram of magnesium stearate and 0.02 gram of zirconium stearate were used, in Test F. 0.735 gram of magnesium stearate and 0.20 gram of zirconium stearate were used, in Test G 0.735 gram of magnesium stearate and 0.40 gram of zirconium stearate were used, and in Test H 0.735 gram of magnesium stearate and 0.67 gram of zirconium stearate were used.

A green disc having a density of 47% of theoretical was formed from each batch powder in the same manner disclosed in Example 1. Also, each green disc was prefired in the same manner as disclosed in Example 1 whereby impurities were eliminated and the stearate precursors were decomposed to form the oxides in the amounts given in Table I.

The furnace was purged with tank hydrogen for two hours and then hydrogen saturated with water in an ice bath was passed into the furnace which was then brought up to 1880° C. in two hours, held at 1880° C. for three hours and shut-off. Dew point of the hydrogen, which was at about atmospheric pressure was measured on the downstream end of the furnace by means of a zirconia oxygen probe and was 0° C.

The sintered discs underwent 23% shrinkage, and each was 2.44 mm thick and achieved theoretical density, i.e. each had a density of 3.98 g/cc.

The tests are tabulated in Table I. The given compact composition shows the % by weight of MgO and $ZrO_2$ based on the weight of alumina.

Each sintered disc of Tests F, G, and H, which illustrate the present invention, was whitish in color and optically highly translucent, i.e. white light passed through each disc to a substantial degree, and when each disc was pressed against newsprint, the newsprint could be read without difficulty. The sintered disc of Test D, doped with MgO only, also was optically translucent but had a fogginess which was not exhibited by the discs of Tests F, G and H, i.e. its clarity was significantly less than the clarity of the discs of Tests F, G and H. The sintered disc of Test E was less foggy than the Test D disc, and not as clear as the sintered discs of Tests F, G and H indicating that 0.002% by weight of $ZrO_2$ is insufficient to produce the desired results.

A thin section, about 50 microns thick, of each sintered disc was investigated by optical microscopy in transmitted white light and the discs of Tests F, G and H were determined to be single phase.

For evaluation each sintered disc was ground and optically polished to wafers 0.76 mm thick.

TABLE I

| Test No. | COMPACT COMPOSITION % by wt. (as oxides) of alumina | | SINTERED BODY | | | |
|---|---|---|---|---|---|---|
| | MgO % | $ZrO_2$ % | OPTICAL Appearance | OPTICAL In-line Transmittance % (Thickness = .76 mm) | Precipitates of $MgAl_2O_4$ | Average Grain Size- $\mu$ |
| D | 0.05 | — | foggy | 60 | Yes | exaggerated grain growth in surface of disc |
| E | 0.05 | 0.002 | foggy | — | — | exaggerated grain growth in surface of disc |
| F | 0.05 | 0.02 | whitish, translucent and clear | — | No | 32.0 (uniform microstructure) |
| G | 0.05 | 0.04 | whitish, translucent and clear | 76 | No | 37.8 (uniform microstructure) |
| H | 0.05 | 0.067 | whitish, translucent and clear | 79 | No | 49.6 (uniform microstructure) |

The optical in-line transmittance obtained for Test Nos. G and H show that optical translucency produced by the present process was substantially higher than that produced by Test No. D where only MgO dopant was used.

EXAMPLE 4

In this series of seven tests, magnesia addition was varied at a constant doping level of zirconia.

Specifically for each test, batch processing comprised adding magnesium stearate and zirconium stearate to 100 grams of alumina powder and the mixture was milled in 100 cc of carbon tetrachloride with 7.5 mm alumina balls for 6 hours. The carbon tetrachloride then was evaporated and the resulting powder screened through a 60 mesh sieve. In each Test, 0.40 gram zirconium stearate was used. 0.14 gram magnesium stearate was added in Test K, 0.28 gram in Test L, 0.44 gram in Test M, 0.59 gram in Test N, 0.74 gram in Test O, 1.47 gram in Test P and 2.21 gram in Test Q.

A green disc, 25 mm in diameter and 3 mm in thickness, was die pressed from each test batch powder to 47% theoretical density at 60 MPA. Each green disc was prefired at 1000° C. for two hours in air. During such prefiring, the magnesium stearate and zirconium stearate decomposed to form MgO and $ZrO_2$. Table II gives the composition of the compact of a green disc, as oxides based on the weight of the alumina.

The furnace was purged with tank hydrogen for two hours and then hydrogen having a dew point higher than −30° C. was passed into the furnace which was then brought up to 1880° C. in two hours, held at 1880° C. for three hours and shut-off. Dew point of the sintering hydrogen atmosphere, which was at about atmospheric pressure, was measured on the downstream end of the furnace by means of a zirconia oxygen probe and was +10° C. Density was obtained on as-fired specimens.

For optical measurements and microscopic observation, the sintered discs were ground to about 0.75 mm wafers and optically polished. In-line transmittance was measured by a spectrophotometer over the whole spectrum of visible light i.e. from 0.3 microns to 0.7 microns. (contrary to the single point technique used in Example 3 both the incident and the transmitted and detected beam angles are near zero; less than one degree). In Table II transmittance in percent is given as read at wavelength of 0.64 microns. The data was normalized to exactly 0.75 mm thickness.

TABLE II

| | COMPACT COMPOSITION % by wt. (as oxides) of alumina | | SINTERED BODY | | | Chemical Analysis | |
|---|---|---|---|---|---|---|---|
| | | | Density | Transmittance at $\lambda = 0.640 \mu$ per 0.75 mm | Microscopic | MgO by wet analysis | $ZrO_2$ by Xray fluorescence (interior of specimen) |
| Test No. | $ZrO_2$ % | MgO % | g/cc | % | Observations | % by wt. | % by wt. |
| K | 0.04 | 0.01 | 3.95 | n.d. | Specimen opaque; spinel precipitates present. | n.d. | n.d. |
| L | 0.04 | 0.02 | 3.96 | n.d. | Specimen shows only isolated translucent domains; nearly opaque | n.d. | n.d. |
| M | 0.04 | 0.03 | 3.98 | 32 | clear, translucent; few isolated pores; no precipitates | 0.028 | 0.039 |
| N | 0.04 | 0.04 | 3.98 | 25 | Clear, translucent; few isolated pores; no precipitates | 0.039 | 0.036 |
| O | 0.04 | 0.05 | 3.98 | 21 | Clear, translucent; few isolated pores; no precipitates | 0.046 | 0.040 |
| P | 0.04 | 0.10 | 3.98 | 11 | Translucent, hazy copious precipitates | n.d. | 0.044 |
| Q | 0.04 | 0.15 | 3.98 | 7.5 | Translucent, hazy copious precipitates | n.d. | n.d. |

In Table II, Tests Nos. M, N and O illustrate the present invention. Specifically, the sintered discs with 100 PPM (Test K) and 200 PPM (Test L) magnesia addition were opaque and were therefore not subjected to optical transmission measurements. The opacity was clearly brought about by high residual porosity which is also reflected in the lower-than theoretical density. Thus, no useful optical ceramics can be obtained with less than about 300 PPM addition of MgO.

Additions of MgO substantially higher than about 300 PPM tend to decrease the in-line optical transmission. For example, at a level of 1000 (Test P) and 1500 PPM (Test Q) magnesia, microscopic observation of the sintered specimens revealed copious transparent precipitates of magnesium aluminate typically 2–10 microns in size. These precipitates were not observed in sintered specimens (Tests M, N and O) doped with 300, 400 and 500 PPM MgO. The sintered specimens of Tests M, N and O were single phase. Also, the sintered specimens of Tests M, N and O were composed entirely of fine uniform grains which had an average grain size of about 25 microns.

The sintered bodies of Tests M, N and O show improved transmission values and are highly useful for optical applications, and specifically as enclosures for discharge lamps.

EXAMPLE 5

In this Example two batches, R and S, of sub-micron α-alumina powder containing 0.0633 wt % MgO were prepared for forming by extrusion of tubing of 0.75 mm wall thickness by identical addition and mixing of extrusion vehicles. To one of the batches, specifically Batch R, was added 0.0826 gram of zirconium nitrate per 100 grams of dry weight powder such addition of zirconium precursor being equivalent to 0.04 gram of zirconium oxide per 100 grams of dry weight powder.

Batches R and S, separately, were further admixed, extruded as tubing, air dried, prefired in air at 1050° C. for 3 hours and subsequently fired in a tungsten mesh furnace at 1900° C. for 4 hours in an atmosphere of hydrogen with dew point higher than −30° C. but less than −10° C. to produce translucent straight tubing of 7.2 mm inside diameter and 0.75 mm wall thickness with a density equivalent to that of theoretically dense alumina, i.e. 3.98 g/cc. Measurements were made of the grain sizes of the tubings by sectioning and optical microscopy. Measurements of total diffuse optical transmission of the tubing walls were made by use of an integrating sphere photometer method calibrated such that a measurement value of 90% or more total transmission through a 0.75 mm wall of standard 7.2 mm inside diameter tube indicted optical quality sufficient for lamp making purposes. The results are given in Table III which shows that Batch R, to which zirconium nitrate was admixed along with MgO, and which illustrates the present invention, simultaneously achieved a uniform, preferred grain size and transmission characteristics acceptable for lamp making purposes whereas Batch S shows a lack of controlled grain structure.

TABLE III

| Test Batch | GREEN COMPOSITION % by wt. (as oxides) of alumina | | SINTERED BODY | |
|---|---|---|---|---|
| | MgO % | ZrO$_2$ % | Average Grain Size (μ) | % Transmission (total) |
| R | 0.0633 | 0.040 | 25 (uniform) | 94.5% |
| S | 0.0633 | 0 | >300 (exaggerated grains) | <94.5% |

EXAMPLE 6

In this example three tests were carried out. In Test T, a batch powder composed of alumina and magnesium oxide was prepared, whereas for Tests U and V batch powders, i.e., homogeneous dispersions, of alumina and magnesium oxide were prepared with specific additions of hafnium oxide.

Specifically, in Test T, batch processing was comprised of adding 100 grams of alumina powder to 0.050 gram of magnesium oxide powder and the mixture was wet milled with alumina grinding balls in methanol for 3 hours and the methanol was then evaporated therefrom to obtain a homogeneous particulate dispersion. Batch compositions for Tests U and V were obtained by adding hafnium oxide powder to separate samples of about twenty grams each of the powder dispersion prepared for Test T. The hafnium oxide powder additions for the preparation of batch powders for Tests U and V were, respectively, in the ratios of 0.0515 gms and 0.130 gms of hafnium oxide powder per 100 grams of the dispersion prepared for Test T. Each of the batch mixtures for Tests U and V were then wet milled with alumina grinding balls in methanol for 3 hours producing homogeneous dispersions, dried in an air oven at 80° C. to 100° C., screened through a plastic screen of about 74 μm mesh opening and subsequently heated to 500° C. for one hour to remove any further water. Dry pressed discs about 1.5 cm in diameter and 2 mm thick were prepared from each of the resulting batch mixtures for Tests T, U and V by pressing in tungsten carbide dies at about 70 MPa pressure. Table IV gives the composition of each compact, i.e. green disc. The green discs were pre-fired in an air furnace for 1 hour at 1000° C. and subsequently fired in a wet hydrogen atmosphere at about +10° C. dewpoint at 1850° C. for 3 hours. Each sintered disc had a density of 3.98 gm/cc, i.e. the theoretical density of alumina. Each sintered disc was ground to 0.75 mm thickness and polished by diamond abrasive lapping. In-line optical transmission measurements were then carried out. Table IV shows the in-line optical transmissions of the polished sintered discs, and the grain sizes of the sintered discs measured by surface lineal analysis.

TABLE IV

| Test No. | COMPACT COMPOSITION % by wt. of Aluminae | | SINTERED BODY | | | | |
|---|---|---|---|---|---|---|---|
| | HfO$_2$ % | MgO % | Average Grain Size Range (μ) | Exaggerated Grain Structure Present | Grain Boundry Phases Present | In-line Transmission % | % Increase of In-line Transmission Relative to Test No. T |
| T | 0 | 0.05 | 15–18 | No | No | 59 | — |
| U | 0.0515 | 0.05 | 17–22 | No | No | 67 | 13.5 |
| V | 0.130 | 0.05 | 17–25 | No | Slight | 62 | 5.1 |

In Table IV, comparisons of Tests U and V, which illustrate the present invention, with Test T, where no HfO$_2$ was used, show significantly increased in-line transmissions produced by the present invention. The sintered bodies of Tests U and V are useful in optical applications, and specifically, as enclosures for discharge lamps.

EXAMPLE 7

In this example four tests were carried out using a batch powder comosed of 100 grams alumina and 0.735 gram magnesium stearate prepared in the same manner as disclosed for Test A in Example 1. This batch was divided into four parts. To the first part, Test Sample W, no additions were made. To the second, third and fourth parts, Test Samples X, Y and Z, additions of hafnium chloride in water solution and zirconium stearate were made in various proportions. Specifically, for Test Samples X, Y and Z, hafnium chloride in water solutions corresponding to 0.0175, 0.0350, 0.0524 grams of hafnium oxide per 100 grams of alumina and zirconium stearate corresponding to 0.031, 0.020 and 0.010 grams of zirconium oxide per 100 grams of alumina were added. Test Samples X, Y and Z were then subjected to freeze drying at a temperature substantially below the freezing points of the hafnium chloridie-water solutions and the water removed by vacuum evaporation leaving the hafnium chloride residues in the resulting particulate homogeneous dispersions. A green disc of each dispersion was then prepared in the same manner disclosed in Example 1. Table V gives the composition of each compact, i.e. green disc, as oxides based on the weight of the alumina. The green discs were fired to dense, sintered discs in the same manner disclosed in Example 1 with the exception that the sintering temperature was 1900° C. For evaluation, each sintered disc was ground and polished. The sintered discs of Tests X, Y and Z, which illustrate the present invention, were whitish in color and optically highly translucent. In-line optical transmission measurements were made of the polished discs.

TABLE V

| | COMPACT COMPOSITION % by wt. (as oxides) of alumina | | | SINTERED BODY | |
|---|---|---|---|---|---|
| Test No. | MgO % | $ZrO_2$ % | $HfO_2$ % | Average* Grain Size μ | In-line Trans mission % |
| W | 0.050 | 0 | 0 | 21.4 | 67.2 |
| X | 0.050 | 0.031 | 0.0175 | 28.2 | 70.1 |
| Y | 0.050 | 0.020 | 0.0350 | 25.0 | 70.0 |
| Z | 0.050 | 0.010 | 0.0524 | 28.5 | 70.6 |

*based on areal measurements
**measurements corrected to a standard sample thickness (0.76 mm).

In Table V, comparisions of Tests X, Y and Z, which illustrate the present invention, with Test W, where no mixture of $ZrO_2$ and $HfO_2$ was used, show significantly increased in-line transmission produced by the present invention. The sintered bodies to Tests X, Y and Z are useful in optical applications, and specifically as enclosures for discharge lamps.

What is claimed is:

1. A process for producing an optically translucent polycrystalline alumina sintered body which consists essentially of providing at least a substantially homogeneous dispersion consisting essentially of alumina, MgO or precursor therefor, and an additive selected from the group consisting of $ZrO_2$, $HfO_2$, and a mixture thereof or precursors therefor, said alumina ranging in composition from $\alpha$-$Al_2O_3$ to at least about 80% by weight $\alpha$-$Al_2O_3$ with the remaining alumina being of polymorphic form other than $\alpha$, said MgO being present in an amount ranging from about 0.03% by weight to less than about 0.15% by weight of said alumina, said $ZrO_2$ being present in an amount ranging from higher than 0.002% by weight up to about 0.07% by weight of said alumina, said $HfO_2$ being present in an amount ranging from higher than 0.003% by weight up to about 0.12% by weight of said alumina, said mixture of $ZrO_2$ and $HfO_2$ being composed of all ratios of $ZrO_2$ and $HfO_2$ and being present in a total amount ranging from higher than 0.002% by weight up to about 0.12% by weight of said alumina, said dispersion having an average crystalline size ranging from about 0.05 micron to less than one micron, forming said dispersion into a green body having a density of at least about 30% of the theoretical density of 3.98 g/cc for alumina, and sintering said body in an atmospheric of hydrogen having a dew point higher than +30° C. at a sintering temperature ranging from about 1750° C. to about 1950° C. producing a sintered body of theoretical density based on the density of 3.98 g/cc for alumina, said precursor decomposing completely below said sintering temperature to form said oxide and by-product gas.

2. The process according to claim 1 wherein said MgO is present in an amount ranging from about 0.03% by weight to about 0.05% by weight of said alumina and said additive is $ZrO_2$ ranging in amount from about 0.01% by weight to about 0.04% by weight of said alumina.

3. The process according to claim 1 wherein said MgO is present in an amount ranging from about 0.03% by weight to about 0.05% by weight of said alumina and said additive is $HfO_2$ ranging in amount from about 0.01% by weight to about 0.07% by weight of said alumina.

4. The process according to claim 1 wherein said MgO is present in an amount ranging from about 0.03% by weight to about 0.05% by weight of said alumina and said additive is said mixture of $ZrO_2$ and $HfO_2$ ranging in amount from about 0.01% by weight to about 0.07% by weight of said alumina.

5. The process according to claim 1 wherein said sintering temperature ranges from about 1800° C. to about 1900° C.

6. The process according to claim 1 wherein said green body is prefired in an oxygen-containing atmosphere at a temperature of from about 800° C. to about 1300° C. for at least about one hour.

7. The process according to claim 1 wherein said green body is heated at a temperature ranging from about 800° C. to about 1300° C. in a wet hydrogen atmosphere having a dew point of at least about 0° C. to eliminate impurities therein which would have a significantly deleterious effect on the optical translucency of said sintered body.

8. An optically translucent polycrystalline alumina sintered body of theoretical density based on the density of 3.98 g/cc for alumina consisting essentially of alumina, magnesium and a component selected from the group consisting of zirconium, hafnium and a mixture thereof, said magnesium being present in an amount equivalent to from about 0.03% MgO by weight to less than about 0.15% MgO by weight of said sintered body, said zirconium being present in an amount equivalent to from higher than about 0.002% $ZrO_2$ by weight up to about 0.07% $ZrO_2$ by weight of said sintered body, said hafnium being present in an amount equivalent to from higher than about 0.003% $HfO_2$ by weight up to about 0.12% $HfO_2$ by weight of said sintered body, said mixture thereof being composed of all ratios of said zirconium and hafnium and being present in an amount equivalent to from higher than 0.002% of the di-oxides thereof by weight up to about 0.12% of the di-oxides thereof by weight of said sintered body, said sintered body ranging from a single phase to one composed of a primary phase and secondary phase ranging up to but less than 1% by volume of the total volume of said sintered body, said sintered body having an average grain size ranging from about 15 microns to about 100 microns.

9. The optically translucent polycrystalline alumina sintered body according to claim 8 wherein said component is zirconium.

10. The optically translucent polycrystalline alumina sintered body according to claim 8 wherein said component is hafnium.

11. The optically translucent polycrystalline alumina sintered body according to claim 8 wherein said component is said mixture of zirconium and hafnium.

12. An optically translucent polycrystalline alumina sintered body of theoretical density based on the density of 3.98 g/cc for alumina consisting essentially of $\alpha$-$Al_2O_3$, magnesium and zirconium, said magnesium being equivalent to about 0.03% MgO by weight to about 0.05% MgO by weight of said sintered body, said zirconium being equivalent to from about 0.01% $ZrO_2$ by weight to about 0.04% $ZrO_2$ by weight of said sintered body, said sintered body ranging from a single phase to one composed of a primary phase and secondary phase ranging up to but less than 1% by volume of the total volume of said sintered body, said sintered body having an average grain size ranging from about 20 microns to about 50 microns.

13. An optically translucent polycrystalline alumina sintered body of theoretical density based on the density of 3.98 g/cc for alumina consisting essentially of $\alpha$-$Al_2O_3$, magnesium and hafnium, said magnesium being equivalent to about 0.03% MgO by weight to about 0.05% MgO by weight of said sintered body, said hafnium being equivalent to from about 0.01% $HfO_2$ by weight to about 0.07% $HfO_2$ by weight of said sintered body, said sintered body ranging from a single phase to one composed of a primary phase and secondary phase ranging up to but less than 1% by volume of the total volume of said sintered body, said sintered body having an average grain size ranging from about 20 microns to about 50 microns.

14. An optically translucent polycrystalline sintered alumina body of theoretical density based on the density of 3.98 g/cc for alumina consisting essentially of $\alpha$-$Al_2O_3$, magnesium, zirconium and hafnium, said magnesium being equivalent to about 0.03% by weight to about 0.05% MgO by weight of said sintered body, the total amount of said zirconium and hafnium being equivalent to from about 0.01% of the di-oxides thereof by weight to about 0.07% of the di-oxides thereof by weight of said sintered body, said sintered body ranging from a single phase to one composed of a primary phase and secondary phase ranging up to but less than 1% by volume of the total volume of said sintered body, said sintered body having an average grain size ranging from about 20 microns to about 50 microns.

* * * * *